No. 880,238. PATENTED FEB. 25, 1908.
J. & W. J. O'HARA.
ADJUSTABLE FASTENING DEVICE FOR BEAMS.
APPLICATION FILED JUNE 15, 1907.
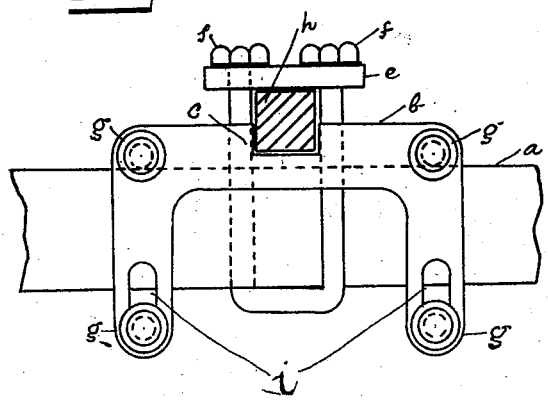
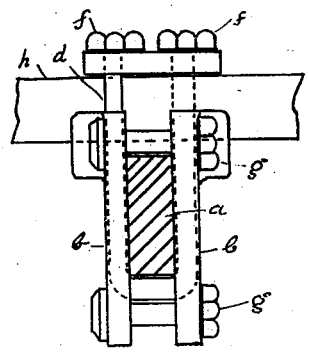
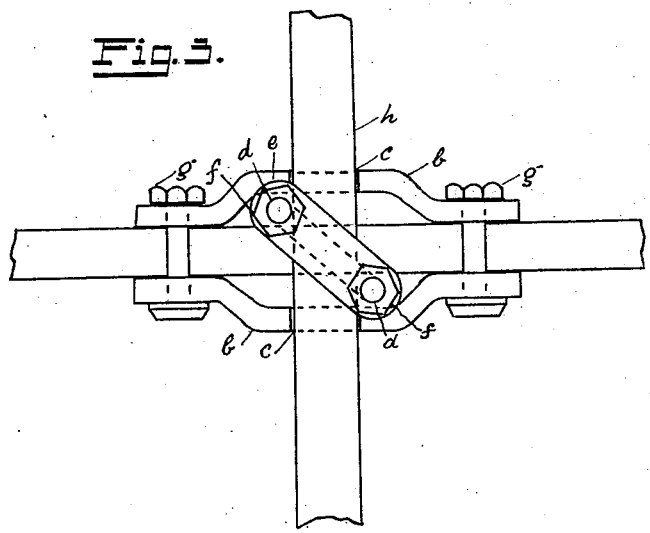

UNITED STATES PATENT OFFICE.

JOSEPH O'HARA AND WILLIAM JAMES O'HARA, OF AUCKLAND, NEW ZEALAND.

ADJUSTABLE FASTENING DEVICE FOR BEAMS.

No. 880,238.  Specification of Letters Patent.  Patented Feb. 25, 1908.

Application filed June 15, 1907. Serial No. 379,290.

*To all whom it may concern:*

Be it known that we, JOSEPH O'HARA and WILLIAM JAMES O'HARA, subjects of the British King, residing at Auckland, in the Colony of New Zealand, have invented certain new and useful Improvements in Adjustable Fastening Devices for Beams; and we do hereby declare the following to be a full, clear, and exact description of the invention, such as will enable others skilled in the art to which it appertains to make and use the same.

Our invention relates to adjustable fastenings for beams, and is intended to connect two beams or intersecting timbers or bars together in an adjustable, rigid, and durable manner.

Our invention will be understood by reference to the accompanying drawings, in which the same parts are indicated by the same letters throughout the several views.

Figure 1 is a sectional elevation of the apparatus as used for connecting a cross piece to a beam. Fig. 2 is an end view of the device shown in Fig. 1, parts being broken away, and Fig. 3 is a side elevation of the device shown in Figs. 1 and 2.

*a* represents the beam to which the cross piece is to be attached.

*b* represents one of two bent side irons, which are notched as at *c* to receive the cross piece *h*.

*d* represents a U-bolt having a cap piece *e* held in place by nuts *f*, which cap piece locks the cross piece *h* in the notches *c*. This U-bolt is located inside of the side irons *b*, as shown in Fig. 3. The side irons are connected together by tie bolts and nuts *g*, and the downwardly projecting legs of the side irons have elongated slots *i*, as shown in Fig. 1, whereby the side irons may be adjusted to different sizes of beams. It will also be evident that the cap piece *e* may be adjusted by screwing up or down on the nuts *f*, so as to fit different sizes of cross pieces *h*. This structure is especially adaptable for connecting the cross bars or standards of plows to the plow beams, as great adjustability of the several parts is secured, and this adjustment may be rapidly made; while the fastening is both strong, durable, and is not apt to get out of order.

Having thus described our invention, what we claim and desire to secure by Letters Patent of the United States, is:—

1. A fastening device for use with beams, comprising two notched side irons provided with downwardly projecting legs opposite said notches, with elongated slots in said legs, bolts and nuts for tying the said side irons together, two of said bolts passing through said elongated slots, a cross piece held in said notches, a U-bolt spanning the beam and cross piece, and having a cap piece engaging the top of said cross piece with nuts for holding said cap piece on said U-bolt, substantially as described.

2. A fastening device for beams, comprising two side irons notched in their centers and projecting outward in reverse directions adjacent to said notches and having their ends terminating in two downwardly projecting legs, with perforations in said side irons and bolts passing through said perforations and nuts, adapted to hold the said side irons to the beam, a cross piece fitting in said notches, and a U-bolt set in the angle between said beam and said cross piece, and holding the two together, the said U-bolt being also held within the said side irons, a cap piece mounted on said U-bolt above said cross piece, and nuts holding said cap piece in place, substantially as described.

In testimony whereof, we affix our signatures, in presence of two witnesses.

JOSEPH O'HARA.
WILLIAM JAMES O'HARA.

Witnesses:
JOSEPH JAMES MACKY,
JOHN VICTOR MACKY.